(12) United States Patent
Kugai et al.

(10) Patent No.: US 6,656,233 B2
(45) Date of Patent: Dec. 2, 2003

(54) METHOD OF PRODUCING NEGATIVE ELECTRODE FOR LITHIUM SECONDARY CELL

(75) Inventors: Hirokazu Kugai, Itami (JP); Nobuhiro Ota, Itami (JP); Shosaku Yamanaka, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 104 days.

(21) Appl. No.: 09/884,633

(22) Filed: Jun. 18, 2001

(65) Prior Publication Data
US 2002/0036131 A1 Mar. 28, 2002

(30) Foreign Application Priority Data

Jul. 19, 2000 (JP) .......................... 2000-219072
Dec. 15, 2000 (JP) .......................... 2000-382173

(51) Int. Cl.[7] .......................... H01M 6/00; B05D 3/02; C23C 14/00
(52) U.S. Cl. ................. 29/623.1; 29/623.5; 427/377; 427/402; 204/192.12
(58) Field of Search .............................. 29/623.1, 623.5, 29/623.3, 730, 731, 25.03; 429/162, 231.95; 204/192.12, 298.16, 298.19, 298.2; 427/377, 248.1, 402

(56) References Cited

U.S. PATENT DOCUMENTS

| | | | |
|---|---|---|---|
| 5,141,614 A | 8/1992 | Akridge et al. | |
| 5,338,625 A | 8/1994 | Bates et al. | |
| 5,561,004 A | 10/1996 | Bates et al. | |
| 5,961,672 A | * 10/1999 | Skotheim et al. | .......... 29/623.5 |
| 6,168,884 B1 | 1/2001 | Neudecker et al. | |

FOREIGN PATENT DOCUMENTS

| | | | |
|---|---|---|---|
| EP | 0206339 | * 12/1986 | ............ H01M/6/18 |
| JP | 62044960 | 2/1987 | |
| JP | 05048582 | 7/1993 | |
| JP | 10058007 | 3/1998 | |

OTHER PUBLICATIONS

Description of MRC sputtering system given at (paper copy only) No date available.

U.S. Patent Application Publication No. US 2002/0028383 A1, published on Mar. 7, 2002, Kugai et al., Title: Thin Alkali Metal Film Member and Method of Producing the Same; Cover Page. 1 sheet of drawings, and pp. 1 to 6.

* cited by examiner

*Primary Examiner*—Stephen Kalafut
*Assistant Examiner*—R Alejandro
(74) *Attorney, Agent, or Firm*—W. F. Fasse; W. G. Fasse

(57) ABSTRACT

A method of independently producing a negative electrode for a lithium secondary cell having thin films of lithium and a sulfide-based inorganic solid electrolyte begins with a negative electrode base material and an inorganic solid electrolyte source material being removed from closed containers in a chamber space, which is substantially inactive to lithium and insulated from air. The materials are transferred into an adjacent thin film deposition system without being exposed to the air. In the system, the source material is used to form a thin film of an inorganic solid electrolyte on the base material, to make the electrode. The electrode is transferred, without being exposed to the air, into a chamber space, which is substantially inactive to lithium, where the electrode is placed into a closed container. Thus, a negative electrode can be produced without being degraded by air.

48 Claims, 1 Drawing Sheet

METHOD OF PRODUCING NEGATIVE ELECTRODE FOR LITHIUM SECONDARY CELL

CROSS-REFERENCE TO RELATED APPLICATION

This application is related to copending application Ser. No. 09/884,632 filed on Jun. 18, 2001.

BACKGROUND OF THE INVENTION

1. Field of the Invention

The present invention relates to a method of producing a negative electrode for use in a lithium secondary cell.

2. Description of the Background Art

A solid secondary cell with a thin lithium film has been proposed. Japanese Patent Laying-Open No. 62-44960 discloses a method for manufacturing such a solid cell. The method includes successively forming a thin film of titanium disulfide as a positive electrode, a thin film of $Li_2O$—$Al_2O_3$ as an electrolyte, and a thin film of Li as a negative electrode on a substrate placed in an ionized cluster beam evaporation system. Japanese Patent Publication No. 5-48582 discloses an electrolytic material for such a solid cell.

On the other hand, advances have been made in commercialization of lithium secondary cells containing an organic solution of electrolytes. Lithium secondary cells are characterized by having a high-energy output per unit area or per unit weight as compared with other cells. Lithium secondary cells have been developed for practical use as a power source in mobile communications equipment, notebook computers, electric vehicles and the like.

An attempt has been made to use lithium metal for a negative electrode for the purpose of improving the performance of the lithium secondary cell containing an organic solution of electrolytes. Such an attempt, however, involves the risk of a dencdroid growth of the lithium metal during charging and discharging. The dendroid growth may form an internal short-circuit to a positive electrode and finally result in an explosion. As a technique for avoiding the risk, an attempt can be made to form a thin film of a sulfide-based inorganic solid electrolyte on the lithium metal.

The lithium metal, the thin film of the sulfide-based inorganic solid electrolyte, and the source materials therefor, however, are highly reactive to water, so that they cause the problem of degradation when exposed to the air. The above-mentioned publications related to the solid cell, however, do not suggest a technique for independently producing a lithium-containing negative electrode itself. The problem of the degradation described above must be resolved for the production of such a freestanding negative electrode containing lithium and the sulfide-based solid electrolyte.

SUMMARY OF THE INVENTION

An object of the present invention is to provide a method of producing a negative electrode for a lithium secondary cell, in which lithium metal, a source material for a thin film of a sulfide-based inorganic solid electrolyte, and a negative electrode having the thin film of the inorganic air. solid electrolyte formed thereon can be prevented from being degraded by The present invention is directed to a method of producing a negative electrode for a lithium secondary cell having a thin film made of an inorganic solid electrolyte. The method includes using a negative electrode base material placed in a closed container and an inorganic solid electrolyte source material placed in a closed container. The negative electrode base material has a surface made of a material selected from the group consisting of lithium metal and lithium alloys. In the method, the negative electrode base material placed in the closed container and the inorganic solid electrolyte source material placed in the closed container are placed into a chamber space, which is substantially inactive to lithium and which is insulated from air and provided adjacent to an apparatus for forming a thin film. In the chamber space, the negative electrode base material and the source material are respectively taken out from the closed containers. Then, the negative electrode base material and the source material taken out are transferred into the apparatus for forming a thin film without being exposed to the air. In the apparatus, the materials are used, and a thin film made of an inorganic solid electrolyte is formed on the negative electrode base material. The negative electrode base material having the thin film formed thereon is then transferred without being exposed to the air into a chamber space, which is substantially inactive to lithium and which is insulated from the air and provided adjacent to the apparatus. In the chamber space, the negative electrode base material having the thin film is placed into a closed container. The negative electrode having the thin film placed in the closed container can be taken out from the chamber into the air without being degraded.

The negative electrode base material for use in the method may be prepared by forming a thin film made of a material selected from the group consisting of lithium metal and lithium alloys on a base material by vapor deposition. The thin film made of the material selected from the group consisting of lithium metal and lithium alloys preferably has a thickness of 20 $\mu$m or less. The thickness of the thin film is typically in the range of 0.1 $\mu$m to 20 $\mu$m, and preferably in the range of 1 $\mu$m to 10 $\mu$m.

The present invention is directed to another method of producing a negative electrode for a lithium secondary cell having a thin film made of an inorganic solid electrolyte. The method includes using a first source material placed in a closed container and a second source material placed in a closed container. The first source material is selected from the group consisting of lithium metal and lithium alloys. The second source material is for use in forming the inorganic solid electrolyte. The first and second source materials respectively placed in the closed containers are placed into a chamber space, which is substantially inactive to lithium and which is insulated from air and provided adjacent to an apparatus for forming a thin film. In the chamber space, the first and second source materials are respectively taken out from the closed containers. Then, the first and second source materials taken out are transferred into the apparatus without being exposed to the air. In the apparatus, the first and second materials are used, and a first thin film made of the first source material and a second thin film made of the second source material are formed on a base material. The base material having the first and second thin films formed thereon is then transferred without being exposed to the air into a chamber space, which is substantially inactive to lithium and which is insulated from the air and provided adjacent to the apparatus. In the chamber space, the base material having the first and second thin films is placed into a closed container. The negative electrode having the thin films placed in the closed container can be taken out from the chamber into the air without being degraded.

In the method, the first thin film may be formed by a vapor deposition method. The first thin film preferably has a thickness of 20 µm or less. The thickness of the thin film formed is typically in the range of 0.1 µm to 20 µm, and preferably in the range of 1 µm to 10 µm.

The present invention is directed to a further method of producing a negative electrode for a lithium secondary cell having a thin film made of an inorganic solid electrolyte. In the method, a first source material selected from the group consisting of lithium metal and lithium alloys is placed in a closed container, and the first source material placed in the container is placed into a chamber space, which is substantially inactive to lithium and which is insulated from air and provided adjacent to a first apparatus for forming a thin film. In the chamber space, the first source material is taken out from the closed container. Then, the first source material taken out is transferred into the first apparatus without being exposed to the air. In the first apparatus, the first source material is used, and a first thin film made of the first source material is formed on a base material. The base material having the first thin film formed thereon is transferred from the first apparatus without being exposed to the air into a chamber space, which is substantially inactive to lithium and which is insulated from the air and provided adjacent to the first apparatus. In the chamber space, the base material having the first thin film formed thereon is placed into a closed container. Then, the base material having the first thin film formed thereon and being placed in the closed container, and a second source material for forming an inorganic solid electrolyte and being placed in a closed container are placed into a chamber space, which is substantially inactive to lithium and which is insulated from the air and provided adjacent to a second apparatus for forming a thin film. In the chamber space, the base material having the first thin film formed thereon and the second source material are respectively taken out from the closed containers. Then, the base material having the first thin film formed thereon and the second source material taken out are transferred into the second apparatus without being exposed to the air. In the second apparatus, the second source material is used, and a second thin film made of the second source material is formed on the first thin film. The base material having the first and second thin films formed thereon is transferred from the second apparatus without being exposed to the air into a chamber space, which is substantially inactive to lithium and which is insulated from the air and provided adjacent to the second apparatus. In the chamber space, the base material is placed into a closed container.

In the method, the first thin film may be formed by a vapor deposition method. The first thin film preferably has a thickness of 20 µm or less. The thickness of the thin film formed is typically in the range of 0.1 µm to 20 µm, and preferably in the range of 1 µm to 10 µm.

As described above, the source materials, the base materials, and the base materials having the thin film can be handled without being exposed to air, so that a negative electrode for a lithium secondary cell can be prepared without being degraded by air.

In the above-described methods, when the source material is taken out and transferred into the apparatus, the chamber space and the apparatus are preferably filled with a gas selected from the group consisting of helium, nitrogen, neon, argon, krypton, a mixture gas of two or more from the foregoing, and dry air having a dew point of −50° C. or below. When the base material having the thin film formed thereon is taken out from the apparatus and transferred into the chamber space to be placed into the closed container, the chamber space and the apparatus are also preferably filled with a gas selected from the group consisting of helium, nitrogen, neon, argon, krypton, a mixture gas of two or more from the foregoing, and dry air having a dew point of −50° C. or below.

The inorganic solid electrolytes may include sulfides, oxides, nitrides, and mixtures thereof such as oxynitrides and oxysulfides. The sulfides may include $Li_2S$, a compound of $Li_2S$ and $SiS_2$, a compound of $Li_2S$ and $GeS_2$, and a compound of $Li_2S$ and $Ga_2S_3$. The oxynitrides may include $Li_3PO_{4-x}N_{2x/3}$, $Li_4SiO_{4-x}N_{2x/3}$, $Li_4GeO_{4-x}N_{2x/3}$ (0<x<4), and $Li_3BO_{3-x}N_{2x/3}$ (0<x<3).

In the present invention, the thin film made of the inorganic solid electrolyte specifically contains components A to C as follows:

A: lithium, the content of which is in the range of 30% to 65% by atomic percent;

B: one or more elements selected from the group consisting of phosphorus, silicon, boron, germanium, and gallium; and C: sulfur.

The thin film made of the inorganic solid electrolyte may further contain at least one of oxygen and nitrogen. The content of element B is typically 0.1% to 30% by atomic percent. The content of element C is typically 20% to 60% by atomic percent. The content of one or both of oxygen and nitrogen is typically 0.1% to 10%.

In the present invention, the thin film made of the inorganic solid electrolyte may be amorphous. The thin film made of the inorganic solid electrolyte preferably has an ionic conductance (conductivity) of at least $1 \times 10^{-4}$ S/cm at 25° C. The ionic conductance of the thin film of the inorganic solid electrolyte at 25° C. may be typically in the range of $1 \times 10^{-4}$ S/cm to $2.5 \times 10^{-3}$ S/cm, and preferably in the range of $5 \times 10^{-4}$ S/cm to $2.5 \times 10^{-3}$ S/cm. The thin film of the inorganic solid electrolyte formed in the present invention may have an activation energy of 40 kJ/mol or below. The activation energy of the thin film of the inorganic solid electrolyte may be in the range of 30 kJ/mol to 40 kJ/mol.

In the present invention, the thin film made of the inorganic solid electrolyte may be formed by a vapor deposition method, and typically, is formed by any one method selected from the group consisting of sputtering, vapor evaporation, laser ablation, and ion plating. In the present invention, the thin film made of lithium metal or a lithium alloy may also be formed by a vapor deposition method, and typically, is formed by any one method selected from the group consisting of sputtering, vapor evaporation, laser ablation, and ion plating.

The negative electrode produced by the present invention may be used to form a lithium secondary cell together with other necessary components such as a separator of porous polymer, a positive electrode, and an organic solution of electrolytes.

According to the present invention, the thin film made of the organic solid electrolyte is formed on the base material having a surface made of lithium metal or a lithium alloy, or the thin film made of lithium metal or a lithium alloy is formed on the negative electrode base material and then the thin film made of the inorganic solid electrolyte is formed thereon. The additive elements of the lithium alloys may include In, Ti, Zn, Bi, and Sn.

The base material having a surface made of lithium or a lithium alloy may be composed of a base material made of a metal or an alloy and a thin film made of lithium or a lithium alloy formed thereon. Specifically, the base material may be composed of a metal material (typically a metal foil or leaf) of at least one selected from the group consisting of copper, nickel, aluminum, iron, niobium, titanium, tungsten, indium, molybdenum, magnesium, gold, silver, platinum, alloys of two or more metals from the foregoing, and stainless steel, and a thin film made of lithium or a lithium alloy formed on the metal material. Alternatively, the base material for use in the process may be composed of a metal oxide such as $SnO_2$ or an electrically conductive carbon such as graphite, and a thin film made of lithium or a lithium alloy formed thereon. In the above-described base materials, the thin film made of lithium or a lithium alloy typically has a thickness of 0.1 $\mu$m to 20 $\mu$m, and preferably a thickness of 1 $\mu$m to 10 $\mu$m. On the other hand, a foil or leaf made of lithium or a lithium alloy may be used as the base material. The base material used in the present invention may have a thickness of 1 $\mu$m to 100 $\mu$m from the viewpoint of application to the lithium cell and may have a thickness of 1 $\mu$m to 20 $\mu$m to give a compact product.

In the present invention, the negative electrode base material for use in depositing the thin lithium metal or lithium alloy film may be made of a metal, an alloy, a metal oxide such as $SnO_2$, an electrically conductive carbon such as graphite, or the like. The metal and the alloy used for the base material may include at least one of copper, nickel, aluminum, iron, niobium, titanium, tungsten, indium, molybdenum, magnesium, gold, silver, platinum, or an alloy of two or more metals from the foregoing, or stainless steel. The negative electrode base material preferably has a thickness of not more than 100 $\mu$m in order to reduce the size of the lithium cell, and preferably has a thickness of not less than 1 $\mu$m in order to keep an enough strength of the base material. Therefore, the thickness of the negative electrode base material may be 1 $\mu$m to 100 $\mu$m, and may be 1 $\mu$m to 20 $\mu$m for compactness.

In the step of forming the thin film made of the inorganic solid electrolyte, the thin film made of the inorganic solid electrolyte may be formed on a heated base material by a vapor deposition method, or the thin film made of the inorganic solid electrolyte may be formed on a base material at room temperature or at a temperature below 40° C. and then the thin film made of the inorganic solid electrolyte may be subjected to heat treatment. Such heat treatment allows the thin film to have a relatively high ionic conductance. Generally, a heater may be used for the heat treatment. The heater employed may be attached to a holder for holding the base material or may be a radiation heater. The heater heats the base material or the thin film formed on the base material. On the other hand, the heating may be effected through a temperature rise caused by plasma or the like during the film deposition. In the film deposition process, plasma or the like can heat the base material, so that the thin film can be formed on the base material having a increased temperature. The heat treatment can effectively be carried out at a temperature higher than room temperature (5° C. to 35° C.) or at a temperature of 40° C. or higher. Thus, a temperature higher than room temperature such as a temperature of 40° C. or higher, preferably 100° C. or higher may be used as the base material temperature in the case that the thin film is heated through the heating of the base material, or as the temperature for the heat treatment of the formed thin film. The thin film of the inorganic solid electrolyte is generally amorphous, and specifically glassy. Therefore, when the heating temperature is too high and close to the glass transition temperature of the thin film of the inorganic solid electrolyte, the amorphous structure of the obtained thin film may be degraded, and its ionic conductance may be lowered. Thus, the heating temperature is preferably below the glass transition temperature of the thin film of the inorganic solid electrolyte. Based on this point, a temperature of 200° C. or below is preferably used as the temperature of the substrate in the case that the thin film is heated through the heating of the substrate, or as the temperature for the heat treatment of the formed thin film. In addition, when the thin film of the inorganic solid electrolyte is formed on lithium metal, the heating temperature is preferably lower than 179° C. which is the melting point of metal lithium. Thus, the heating temperature is preferably lower than a temperature at which the texture of the thin film of the inorganic solid electrolyte changes (for instance, the glass transition temperature of the thin film of the inorganic solid electrolyte) and lower than a temperature at which the structure of the base material can no longer be maintained (for instance, the melting point of the base material). Specifically, the heating temperature is preferably 40° C. to 200° C., and more preferably not lower than 100° C. and lower than 179° C.

The thin film of the inorganic solid electrolyte formed in the present invention typically has a thickness of 0.01 $\mu$m to 10 $\mu$m, and preferably a thickness of 0.1 $\mu$m to 2 $\mu$m.

In the present invention, the degree of vacuum of the background in the vapor deposition method is preferably not higher than $1.33 \times 10^{-4}$ Pa ($1 \times 10^{-6}$ Torr). When the thin film of the inorganic solid electrolyte is formed on lithium metal or a lithium alloy, a low vacuum degree may induce oxidation or degradation of the lithium by water. The atmosphere under which the thin film is formed by the vapor deposition method may comprise a gas inactive to lithium, such as helium, neon, argon, krypton, or a mixture gas of two or more from the foregoing. The purity of the gas constituting the atmosphere is preferably at least 99.99% so that no degradation of the lithium due to the water may occur when the thin film of the inorganic solid electrolyte is formed on lithium metal or a lithium alloy.

The foregoing and other objects, features, aspects and advantages of the present invention will become more apparent from the following detailed description of the present invention when taken in conjunction with the accompanying drawings.

Figure 1:
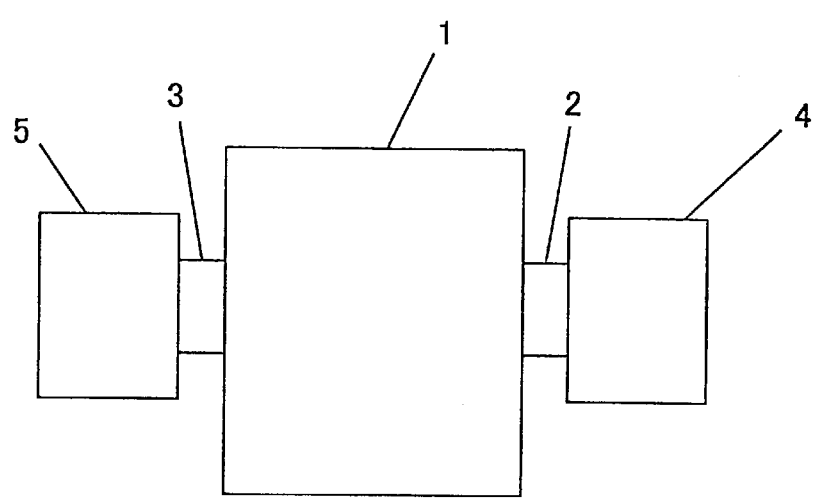
FIG. 1 is a schematic diagram showing the entire formation of an apparatus used for the present invention.

In the drawing, a thin film deposition system is denoted by a reference numeral 1, an inlet of the thin film deposition system by 2, an outlet of the thin film deposition system by 3, and chambers by 4 and 5.

DESCRIPTION OF THE PREFERRED EMBODIMENTS

EXAMPLE 1

A copper foil or leaf having a size of 100 mm×50 mm and a thickness of 10 $\mu$m was bonded to a lithium metal foil or leaf having the same size and a thickness of 50 $\mu$m to produce a negative electrode base material. On the lithium metal foil or leaf of the produced base material, a thin film of an inorganic solid electrolyte having a thickness of 1 $\mu$m was formed by the sputtering of a $Li_2S$—$SiS_2$—$P_2O_5$-based target at room temperature under an Ar gas atmosphere to produce a negative electrode.

As described below, the negative electrode base material and the $Li_2S$—$SiS_2$—$P_2O_5$-based target is placed into a thin film deposition system and the negative electrode having the thin film of the inorganic solid electrolyte is taken out. FIG. 1 shows the entire formation of the apparatus used for the production of the negative electrode. First, the negative electrode base material and the target contained in a closed container of glass, plastic or the like is introduced into a chamber 4 attached to an inlet 2 of a thin film deposition system 1, and then, air is evacuated from chamber 4. Then, chamber 4 is filled with argon gas having a purity of 99.99%. Thin film deposition system 1 is also filled with argon gas of 99.99% purity. Gloves are attached to chamber 4 so that one may insert the hands into the gloves to perform operations within chamber 4. The closed container is opened in chamber 4, and the negative electrode base material having the lithium metal foil or leaf and the target are taken out. Then, a door at inlet 2 of the thin film deposition system is opened, the negative electrode base material and the target are placed into thin film deposition system 1, and the door at inlet 2 is closed. In this manner, the negative electrode base material and the target are placed into thin film deposition system 1 without being exposed to air.

In thin film deposition system 1, the target is used and the thin film of the inorganic solid electrolyte is formed on the negative electrode base material by the sputtering to produce a negative electrode. Then, thin film deposition system 1 is filled with argon gas having a purity of 99.99%. Then, air is evacuated from a chamber 5 attached to an outlet 3 of thin film deposition system 1, and thereafter, chamber 5 is filled with argon gas of 99.99% purity. Like chamber 4, chamber 5 also has gloves so that one may insert the hands into the gloves to perform operations within chamber 5. A door at outlet 3 of the thin film deposition system is opened, the negative electrode having the thin film of the inorganic solid electrolyte is taken out from thin film deposition system 1 and is placed into chamber 5, and the door at outlet 3 is closed. A closed container of glass, plastic or the like was placed into chamber 5 in advance. The negative electrode having the thin film of the inorganic solid electrolyte is placed into the container and the container is closed, and the closed container is taken out into the air. In this manner, the negative electrode having the thin film of the inorganic solid electrolyte can be transferred from thin film deposition system 1 to another place without being exposed to the air.

In this process, any one of helium, nitrogen, neon, argon, and krypton, or a mixture gas of two or more from the foregoing, or dry air having a dew point of −50° C. or below can be used without a problem. The gases used in the respective chambers and the thin film deposition system may be the same or different as required.

The apparatus as shown in FIG. 1 has both of inlet 2 and outlet 3 for the thin film deposition system. Alternatively, one passage may double as the inlet and the outlet, and one chamber may be provided though which the base member and the source material are introduced into the thin film deposition system and the negative electrode is taken out from the thin film deposition system.

An X-ray diffraction analysis revealed that the formed thin film of the inorganic solid electrolyte was in an amorphous state. The ionic conductance of the thin film of the inorganic solid electrolyte was $3 \times 10^{-4}$ S/cm at 25° C. A composition analysis revealed that the thin film had a composition of Li (0.42):Si (0.13):S (0.44):P (0.002):O (0.008) by atomic ratio.

A mixture solution of ethylene carbonate (EC) and propylene carbonate (PC) was heated, and then $LiPF_6$ was dissolved in the solution. Polyacrylonitrile (PAN) was dissolved in the mixture solution in a high concentration. The solution was cooled to give a PAN preparation containing large amounts of EC and PC with $LiPF_6$ dissolved. $LiCoO_2$ particles as an active material and carbon particles for providing electron conductivity were added to the PAN preparation. The resulting mixture was applied in a thickness of 300 μm onto a 20 μm-thick aluminum foil or leaf (a collector member for a positive electrode) to produce a positive electrode.

The negative electrode having the thin film of the solid electrolyte, a separator (porous polymer film) and the positive electrode were stacked and then placed into a stainless steel container to be sealed. An organic solution of an electrolyte containing 1 mole % $LiPF_6$ as the electrolytic salt in a mixture solution of ethylene carbonate and propylene carbonate was added dropwise to the container. In such a process, a lithium secondary cell was prepared under an argon gas atmosphere having a dew point of −60° C. or below.

The prepared cell was examined for the charge and discharge characteristics. In the examination, the cell was charged at a voltage of 4.2 V and maintained a capacity of 0.5 Ah (ampere-hour) until a constant discharge at 100 mA allowed the voltage to drop to 3.5 V. The energy density of the cell was 490 Wh (watt-hour)/l (liter). The cell also remained stable after one hundred cycles of charge and discharge under the same conditions.

EXAMPLE 2

Except that the thin film of the inorganic solid electrolyte was formed by vacuum evaporation, a negative electrode and a lithium secondary cell were produced and evaluated as in Example 1. The obtained results were the same as those in Example 1.

EXAMPLE 3

Except that the thin film of the inorganic solid electrolyte was formed by laser ablation, a negative electrode and a lithium secondary cell were produced and evaluated as in Example 1. The composition of the formed thin film was found to be Li (0.40):Si (0.13):S (0.46):P (0.003):O (0.007) by atomic ratio. Except for the composition, the obtained results were the same as those in Example 1.

EXAMPLE 4

Except that the thin film of the inorganic solid electrolyte was formed by ion plating, a negative electrode and a lithium secondary cell were produced and evaluated as in Example 1. The obtained results were the same as those in Example 1.

EXAMPLE 5

A copper foil or leaf having a size of 100 mm×50 mm and a thickness of 10 μm was placed in a thin film deposition system. On the copper foil or leaf, a thin film of lithium metal having a thickness of 5 μm was formed by the sputtering of a lithium metal target, and thereon, a thin film of an inorganic solid electrolyte having a thickness of 1 μm was formed by the sputtering of a $Li_2S$—$SiS_2$—$P_2O_5$-based target. The sputtering was carried out at room temperature under an Ar gas atmosphere. As in the case of Example 1, the lithium metal target and the $Li_2S$—$SiS_2$—$P_2O_5$-based target were introduced into a thin film deposition system and the negative electrode having the thin films of lithium metal and the inorganic solid electrolyte were taken out. The apparatus as shown in FIG. 1 was used to produce a negative electrode.

After the copper foil or leaf was placed into thin film deposition system 1, closed containers of glass, plastic or the like respectively containing the two targets were placed into chamber 4 attached to inlet 2 of thin film deposition system 1, and then, air was evacuated from chamber 4. Then, chamber 4 was filled with argon gas having a purity of 99.99%. Thin film deposition system 1 was also filled with argon gas of 99.99% purity. By the hands inserted into the gloves attached to chamber 4, the closed containers were opened in chamber 4 and the two targets were respectively taken out from the closed containers. Then, a door at inlet 2 of the thin film deposition system was opened, the two targets were placed into thin film deposition system 1, and the door at inlet 2 was closed. In this manner, the two targets were placed into thin film deposition system 1 without being exposed to the air. In thin film deposition system 1, a lithium metal thin film was formed on the copper foil or leaf by the sputtering of the lithium metal target, and thereon, a thin film of an inorganic solid electrolyte was formed by the sputtering of the $Li_2S$—$SiS_2$—$P_2O_5$-based target. Thereafter, air was evacuated from chamber 5 attached to outlet 3 of thin film deposition system 1 filled with argon gas of 99.99% purity. Chamber 5 was then filled with argon gas of 99.99% purity. By the hands inserted into the gloves attached to chamber 5, a door at outlet 3 of the thin film deposition system was opened, the negative electrode having the two kinds of thin films was taken out from thin film deposition system 1 and then placed into chamber 5, and the door at outlet 3 was closed. A closed container of glass, plastic or the like was provided in chamber 5 in advance, and the negative electrode having the thin films was placed into the container. The container was closed, and the closed container was taken out into the air.

The obtained negative electrode was examined as in the case of Example 1. The obtained results were the same as those in Example 1.

EXAMPLE 6

Except that the thin film of lithium metal and the thin film of the inorganic solid electrolyte were formed by vacuum evaporation, a negative electrode and a lithium secondary cell were produced and evaluated as in Example 4. The obtained results were the same as those in Example 1.

EXAMPLE 7

Except that the thin film of lithium metal and the thin film of the inorganic solid electrolyte were formed by laser ablation, a negative electrode and a lithium secondary were produced and evaluated as in Example 5. The obtained results were the same as those in Example 4.

EXAMPLE 8

Except that the thin film of the inorganic solid electrolyte was formed by ion plating, a negative electrode and a lithium secondary cell were produced and evaluated as in Example 1. The obtained results were the same as those in Example 1.

EXAMPLE 9

Except that $Li_2S$—$SiS_2$—$Li_2O$—$P_2O_5$ was used to form the thin film of the inorganic solid electrolyte, a negative electrode and a secondary cell were produced and evaluated as in Example 1. The composition of the thin film was Li (0.43):Si (0.12):S (0.44):P (0.002):O (0.008) by atomic ratio. Except for the composition, the obtained results were the same as those in Example 1.

EXAMPLE 10

Except that the thin film of the inorganic solid electrolyte was formed by vacuum evaporation, a negative electrode and a lithium secondary cell were produced and evaluated as in Example 9. The obtained results were the same as those in Example 9.

EXAMPLE 11

Except that the thin film of the inorganic solid electrolyte was formed by laser ablation, a negative electrode and a lithium secondary cell were produced and evaluated as in Example 9. As a result, the composition of the thin film was found to be Li (0.41):Si (0.13):S (0.45):P (0.002):O (0.008) by atomic ratio. Except for the composition, the obtained results were the same as those in Example 9.

EXAMPLE 12

Except that the thin film of the inorganic solid electrolyte was formed by ion plating, a negative electrode and a lithium secondary cell were produced and evaluated as in Example 9. The obtained results were the same as those in Example 9.

EXAMPLE 13

Except that $Li_2S$—$SiS_2$—$Li_2O$—$P_2O_5$ was used to form the thin film of the inorganic solid electrolyte and the thin film of lithium metal was formed by vacuum evaporation, a negative electrode and a lithium secondary cell were produced and evaluated as in Example 9. The obtained results were the same as those in Example 9.

EXAMPLE 14

Except that the thin film of the inorganic solid electrolyte was formed by vacuum evaporation, a negative electrode and a lithium secondary cell were produced and evaluated as in Example 13. The obtained results were the same as those in Example 9.

EXAMPLE 15

Except that the thin film of the inorganic solid electrolyte was formed by laser ablation, a negative electrode and a lithium secondary cell were produced and evaluated as in Example 13. The obtained results were the same as those in Example 11.

EXAMPLE 16

Except that the thin film of the inorganic solid electrolyte was formed by ion plating, a negative electrode and a lithium secondary cell were produced and evaluated as in Example 13. The obtained results were the same as those in Example 9.

EXAMPLE 17

A lithium metal thin film having a thickness of 10 $\mu$m was formed on a copper foil or leaf having a size of 100 mm×50 mm and a thickness of 10 $\mu$m by vacuum evaporation. On the thin film of lithium metal, a thin film of an inorganic solid electrolyte was formed to have a thickness of 1 $\mu$m. On the other hand, two lithium metal foils or leafs each having the same size as the copper foil or leaf and each having a thickness of 30 $\mu$m were bonded to each other. The bonded lithium foils or leafs were used in place of the copper foil or leaf. The thin film of the inorganic solid electrolyte could be formed in a similar manner on the bonded lithium metal foils or leafs. As in the case of Example 1, the lithium metal target and the electrolyte target were placed into the thin film deposition system and the negative electrode having the lithium metal thin film and the thin film of the inorganic solid electrolyte were taken out. The apparatus as shown in FIG. 1 was used to produce the negative electrode. The conditions as shown in Tables 1 to 5 were used to form thin films of inorganic solid electrolytes. Tables 1 to 5 also show the ionic conductance at 25° C. of the thin films of the inorganic solid electrolytes, and the activation energy of the thin film of the inorganic solid electrolytes. The activation energy was obtained by the measurement of the temperature dependency of the ionic conductance at raised temperatures.

TABLE 1

| Sample No. | Method of film deposition | Inorganic solid electrolyte material | Film deposition temperature (° C.) | Temperature of heat treatment after film deposition (° C.) | Ionic conductance (S/cm) | Activation energy (kJ/mol) |
|---|---|---|---|---|---|---|
| 1 | Sputtering | $57Li_2S-38SiS_2-5(Li_2O-P_2O_5)$ | 50 | No heat treatment | $7.0 \times 10^{-4}$ | 36 |
| 2 | Sputtering | $57Li_2S-38SiS_2-5(Li_2O-P_2O_5)$ | 100 | No heat treatment | $1.8 \times 10^{-3}$ | 32 |
| 3 | Sputtering | $57Li_2S-38SiS_2-5(Li_2O-P_2O_5)$ | 130 | No heat treatment | $2.0 \times 10^{-3}$ | 32 |
| 4 | Sputtering | $57Li_2S-38SiS_2-5(Li_2O-P_2O_5)$ | Room temperature (25° C.) | 50 | $6.0 \times 10^{-4}$ | 37 |
| 5 | Sputtering | $57Li_2S-38SiS_2-5(Li_2O-P_2O_5)$ | Room temperature (25° C.) | 100 | $1.6 \times 10^{-3}$ | 33 |
| 6 | Sputtering | $57Li_2S-38SiS_2-5(Li_2O-P_2O_5)$ | Room temperature (25° C.) | 130 | $1.7 \times 10^{-3}$ | 32 |
| 7 | Sputtering | $60Li_2S-40SiS_2$ | 100 | No heat treatment | $1.5 \times 10^{-3}$ | 34 |
| 8 | Sputtering | $60Li_2S-40SiS_2$ | 150 | No heat treatment | $1.5 \times 10^{-3}$ | 33 |

TABLE 2

| Sample No. | Method of film deposition | Inorganic solid electrolyte material | Film deposition temperature (° C.) | Temperature of heat treatment after film deposition (° C.) | Ionic conductance (S/cm) | Activation energy (kJ/mol) |
|---|---|---|---|---|---|---|
| 9 | Sputtering | $60Li_2S-40SiS_2$ | Room temperature (25° C.) | 150 | $1.5 \times 10^{-3}$ | 32 |
| 10 | Sputtering | $57Li_2S-38SiS_2-5Li_3PO_4$ | 130 | No heat treatment | $1.7 \times 10^{-3}$ | 34 |
| 11 | Sputtering | $59.5Li_2S-40SiS_2-0.5Li_3PO_4$ | 130 | No heat treatment | $1.6 \times 10^{-3}$ | 34 |
| 12 | Sputtering | $57Li_2S-38SiS_2-5Li_4SiO_4$ | 130 | No heat treatment | $1.8 \times 10^{-3}$ | 33 |
| 13 | Sputtering | $57Li_2S-38SiS_2-5Li_3PO_{3.9}N_{0.1}$ | 130 | No heat treatment | $1.8 \times 10^{-3}$ | 34 |
| 14 | Sputtering | $65Li_2S-34.5SiS_2-0.5Li_3PO_4$ | 130 | No heat treatment | $1.7 \times 10^{-3}$ | 34 |
| 15 | Laser ablation | $60Li_2S-40SiS_2$ | 120 | No heat treatment | $1.9 \times 10^{-3}$ | 33 |
| 16 | Laser ablation | $57Li_2S-38SiS_2-5(Li_2O-P_2O_5)$ | 120 | No heat treatment | $2.0 \times 10^{-3}$ | 32 |
| 17 | Laser ablation | $57Li_2S-38SiS_2-5Li_3PO_4$ | 120 | No heat treatment | $2.0 \times 10^{-3}$ | 33 |
| 18 | Laser ablation | $57Li_2S-38SiS_2-5Li_4SiO_4$ | 120 | No heat treatment | $2.1 \times 10^{-3}$ | 34 |

TABLE 3

| Sample No. | Method of film deposition | Inorganic solid electrolyte material | Film deposition temperature (° C.) | Temperature of heat treatment after film deposition (° C.) | Ionic conductance (S/cm) | Activation energy (kJ/mol) |
|---|---|---|---|---|---|---|
| 19 | Laser ablation | $60Li_2S-40SiS_2$ | Room temperature (25° C.) | 140 | $1.7 \times 10^{-3}$ | 33 |
| 20 | Laser ablation | $57Li_2S-38SiS_2-5(Li_2O-P_2O_5)$ | Room temperature (25° C.) | 140 | $2.0 \times 10^{-3}$ | 32 |
| 21 | Laser ablation | $57Li_2S-38SiS_2-5Li_3PO_4$ | Room temperature (25° C.) | 140 | $1.8 \times 10^{-3}$ | 34 |
| 22 | Laser ablation | $57Li_2S-38SiS_2-5Li_4SiO_4$ | Room temperature (25° C.) | 140 | $1.7 \times 10^{-3}$ | 34 |
| 23 | Vacuum evaporation | $60Li_2S-40SiS_2$ | 120 | No heat treatment | $1.7 \times 10^{-3}$ | 33 |
| 24 | Vacuum evaporation | $60Li_2S-40SiS_2$ | 150 | No heat treatment | $1.8 \times 10^{-3}$ | 32 |
| 25 | Vacuum evaporation | $57Li_2S-38SiS_2-5Li_3PO_4$ | 100 | No heat treatment | $1.8 \times 10^{-3}$ | 33 |
| 26 | Vacuum evaporation | $57Li_2S-38SiS_2-5Li_3PO_4$ | 120 | No heat treatment | $2.0 \times 10^{-3}$ | 32 |
| 27 | Vacuum evaporation | $57Li_2S-38SiS_2-5Li_3PO_4$ | 160 | No heat treatment | $2.1 \times 10^{-3}$ | 31 |

TABLE 4

| Sample No. | Method of Film deposition | Inorganic solid electrolyte material | Film deposition temperature (° C.) | Temperature of heat treatment after film deposition (° C.) | Ionic conductance (S/cm) | Activation energy (kJ/mol) |
|---|---|---|---|---|---|---|
| 28 | Vacuum evaporation | $60Li_2S-39.5SiS_2-0.5Li_3PO_4$ | 120 | No heat treatment | $1.8 \times 10^{-3}$ | 33 |
| 29 | Vacuum evaporation | $57Li_2S-38SiS_2-5(Li_2O-P_2O_5)$ | 120 | No heat treatment | $2.0 \times 10^{-3}$ | 32 |
| 30 | Vacuum evaporation | $57Li_2S-38SiS_2-5Li_4SiO_4$ | 120 | No heat treatment | $2.0 \times 10^{-3}$ | 34 |
| 31 | Vacuum evaporation | $60Li_2S-39.5SiS_2-0.5Li_4SiO_4$ | 120 | No heat treatment | $2.1 \times 10^{-3}$ | 33 |
| 32 | Vacuum evaporation | $57Li_2S-38SiS_2-5Li_3BO_3$ | 120 | No heat treatment | $1.8 \times 10^{-3}$ | 34 |
| 33 | Vacuum evaporation | $57Li_2S-38SiS_2-5Li_4GeO_4$ | 120 | No heat treatment | $1.7 \times 10^{-3}$ | 33 |
| 34 | Vacuum evaporation | $60Li_2S-39.5GeS_2-0.5Li_4SiO_4$ | 120 | No heat treatment | $1.5 \times 10^{-3}$ | 33 |
| 35 | Vacuum evaporation | $60Li_2S-39.5Ga_2S_3-0.5Li_4SiO_4$ | 120 | No heat treatment | $1.8 \times 10^{-3}$ | 32 |

TABLE 4-continued

| Sample No. | Method of Film deposition | Inorganic solid electrolyte material | Film deposition temperature (° C.) | Temperature of heat treatment after film deposition (° C.) | Ionic conductance (S/cm) | Activation energy (kJ/mol) |
|---|---|---|---|---|---|---|
| 36 | Vacuum evaporation | $60Li_2S$—$39.5P_2S_5$—$0.5Li_4SiO_4$ | 120 | No heat treatment | $1.7 \times 10^{-3}$ | 34 |
| 37 | Vacuum evaporation | $57Li_2S$—$38SiS_2$—$5Li_3PO_4$ | Room temperature (25° C.) | 120 | $1.9 \times 10^{-3}$ | 34 |

TABLE 5

| Sample No. | Method of film deposition | Inorganic solid electrolyte material | Film deposition temperature (° C.) | Temperature of heat treatment after film deposition (° C.) | Ionic conductance (S/cm) | Activation energy (kJ/mol) |
|---|---|---|---|---|---|---|
| 38 | Vacuum evaporation | $57Li_2S$—$38SiS_2$—$5Li_4SiO_4$ | Room temperature (25° C.) | 160 | $1.8 \times 10^{-3}$ | 33 |
| 39 | Vacuum evaporation | $60Li_2S$—$40SiS_2$ | Room temperature (25° C.) | 120 | $1.7 \times 10^{-3}$ | 32 |
| 40 | Vacuum evaporation | $57Li_2S$—$38SiS_2$—$5Li_3PO_{3.9}N_{0.1}$ | 120 | No heat treatment | $1.9 \times 10^{-3}$ | 33 |
| 41 | Vacuum evaporation | $60Li_2S$—$39.5SiS_2$—$0.5Li_3PO_4$ | 120 | No heat treatment | $2.0 \times 10^{-3}$ | 32 |
| 42 | Vacuum evaporation | $65Li_2S$—$34.5SiS_2$—$0.5Li_3PO_4$ | 130 | No heat treatment | $1.9 \times 10^{-3}$ | 34 |
| 43 | Vacuum evaporation | $55Li_2S$—$44.5SiS_2$—$0.5Li_3PO_4$ | 130 | No heat treatment | $1.8 \times 10^{-3}$ | 33 |
| 44 | Ion plating | $57Li_2S$—$38SiS_2$—$5Li_3PO_4$ | 120 | No heat treatment | $1.8 \times 10^{-3}$ | 33 |
| 45 | Ion plating | $60Li_2S$—$39.5SiS_2$—$0.5Li_3PO_4$ | 120 | No heat treatment | $2.0 \times 10^{-3}$ | 32 |
| 46 | Ion plating | $57Li_2S$—$38SiS_2$—$5Li_3PO_4$ | Room temperature (25° C.) | 120 | $1.7 \times 10^{-3}$ | 34 |
| 47 | Ion plating | $60Li_2S$—$39.5SiS_2$—$0.5Li_3PO_4$ | Room temperature (25° C.) | 120 | $1.9 \times 10^{-3}$ | 32 |

Each base material having the thin film of lithium metal and the thin film of the inorganic solid electrolyte formed thereon was used as a negative electrode to produce a lithium secondary cell. Each negative electrode, a separator of porous polymer film, a positive electrode, an organic solution of electrolytes, and other conventionally required components were assembled into a lithium secondary cell. The outline of the process of the cell and the results of examining the cell are as follows.

A mixture solution of ethylene carbonate (EC) and propylene carbonate (PC) was heated, and then $LiPF_6$ was dissolved in the solution. Polyacrylonitrile (PAN) was dissolved in the mixture solution in a high concentration. The solution was cooled to give a PAN preparation containing large amounts of EC and PC with $LiPF_6$ dissolved. $LiCoO_2$ particles as an active material and carbon particles for providing electron conductivity were added to the PAN preparation. The resulting mixture was applied in a thickness of 300 μm onto a 20 μm-thick aluminum foil or leaf (a collector member for a positive electrode) to produce a positive electrode.

Each negative electrode having the thin film of the solid electrolyte, a separator (porous polymer film), and the positive electrode were stacked and then placed into a stainless steel container. An organic solution of an electrolyte containing 1 mole % $LiPF_6$ as the electrolytic salt in a mixture solution EC and PC was added dropwise to the container. The stainless steel container was sealed under an argon gas atmosphere having a dew point of −60° C. or below to give a lithium secondary cell.

The prepared cells were examined for the charge and discharge characteristics. In the examination, each cell was charged at a voltage of 4.2 V and maintained a capacity of 0.5 Ah (ampere-hour) until a constant discharge at 100 mA allowed the voltage to drop to 3.5 V. The energy density of each cell was in the range of 500 to 550 Wh (watt-hour)/l (liter). Each cell also remained stable after one hundred cycles of charge and discharge under the same conditions.

In Examples 5 to 8 and 13 to 16, the thin lithium metal film and the thin film of the inorganic solid electrolyte may be formed by the same method, or by different methods. In the latter case, an apparatus available for two or more kinds of thin film deposition methods may be used, and for example, the thin lithium metal film may be formed by vacuum evaporation and the thin film of the inorganic solid electrolyte by sputtering.

In Examples 5 to 8, the thin lithium metal film and the thin film of the inorganic solid electrolyte were formed in the same apparatus. Alternatively, first, the thin lithium metal film may only be formed, and then, the thin film of the inorganic solid electrolyte may be formed on the lithium film by a similar process in another apparatus. Specifically, the following process may be employed. The thin lithium metal film is formed on the base member by a process similar to that in the Examples, and the product may be placed into a closed container without being exposed to the air. By a process similar to that in the Examples, the base member having the thin lithium metal film is taken out from the closed container into another apparatus without being exposed to the air. The thin film of the inorganic solid electrolyte is formed in the different apparatus. In a similar manner, the obtained negative electrode is placed into a closed container without being exposed to the air.

Instead of the lithium metal, lithium alloys may be used. The additive elements that can constitute the lithium alloys may include In, Ti, Zn, Bi, and Sn. The lithium alloys may be deposited on the base material by a common vapor deposition method such as sputtering, vacuum evaporation, or laser ablation.

As seen from the above, the negative electrode produced according to the present invention can offer the lithium secondary cell a high energy density, excellent charge and discharge cycle characteristics, and high stability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of independently producing an independent negative electrode by itself, wherein said negative electrode includes a thin film of an inorganic solid electrolyte and is suitable for use in a lithium secondary cell, wherein said method comprises the following steps in sequence:

a) providing a plurality of containers including at least one closed container containing a source material for said inorganic solid electrolyte and containing a negative electrode base material having a surface made of at least one of lithium metal and lithium alloys;

b) placing said at least one closed container into at least one inlet chamber space insulated from air;

c) opening said at least one closed container in said at least one inlet chamber space, and taking out said base material and said source material from said at least one container in said at least one inlet chamber space;

d) transferring said base material and said source material, without exposure to air, from said at least one inlet chamber space into a film forming apparatus that is adjacent and connected in an airtight manner to said at least one inlet chamber space;

e) in said apparatus, carrying out a film forming process using said source material to form said thin film of said inorganic solid electrolyte on said base material, to thereby make said independent negative electrode including said base material with said thin film formed thereon;

f) transferring said independent negative electrode, without exposure to air, from said film forming apparatus into an outlet chamber space that is insulated from air and is adjacent and connected in an airtight manner to said film forming apparatus;

g) in said outlet chamber space, without exposing said independent negative electrode to air, placing said independent negative electrode into a storage container selected from among said plurality of containers, and closing said storage container; and h) removing said storage container, with said independent negative electrode closed therein, from said outlet chamber space into an environment of atmospheric air.

2. The method according to claim 1, wherein said at least one inlet chamber space and said outlet chamber space is respectively substantially inactive to lithium.

3. The method according to claim 1, wherein said outlet chamber space is separate and distinct from said at least one inlet chamber space.

4. The method according to claim 1, wherein said outlet chamber space is the same chamber space as one of said at least one inlet chamber space.

5. The method according to claim 1, wherein said storage container is separate and distinct from said at least one closed container.

6. The method according to claim 1, wherein said storage container is the same container as one of said at least one closed container being reused as said storage container.

7. The method according to claim 1, further comprising, after said step h), taking said independent negative electrode out of said storage container, and assembling said independent negative electrode with other components to make a lithium secondary cell.

8. The method according to claim 1, before said step a) further comprising a preliminary step of making said negative electrode base material by forming a thin film of said at least one of lithium metal and lithium alloys to form said surface on a substrate material by a vapor deposition process.

9. The method according to claim 8, comprising carrying out said vapor deposition process so as to form said thin film with a thickness of at most 20 μm on said substrate material.

10. The method according to claim 1, further comprising, during said steps c) and d), filling said at least one inlet chamber space and said film forming apparatus with a gas selected from the group consisting of helium, nitrogen, neon, argon, krypton, a mixture gas of at least two of the foregoing gases, and dry air having a dew point of −50° C. or below.

11. The method according to claim 1, further comprising, during said steps f) and g), filling said outlet chamber space and said film forming apparatus with a gas selected from the group consisting of helium, nitrogen, neon, argon, krypton, a mixture gas of at least two of the foregoing gases, and dry air having a dew point of −50° C. or below.

12. The method according to claim 1, wherein said thin film of said inorganic solid electrolyte has a composition containing: 30 to 65 atomic percent of lithium; sulfur; and at least one element selected from the group consisting of phosphorous, silicon, boron, germanium, and gallium.

13. The method according to claim 12, wherein said composition further contains at least one of oxygen and nitrogen.

14. The method according to claim 12, wherein said thin film of said inorganic solid electrolyte is amorphous.

15. The method according to claim 12, wherein said thin film of said inorganic solid electrolyte has an ionic conductance of at least $1 \times 10^{-4}$ S/cm at 25° C.

16. The method according to claim 12, wherein said film forming process is a process selected from the group consisting of sputtering, vapor evaporation, laser ablation, and ion plating.

17. A method of independently producing an independent negative electrode by itself, wherein said negative electrode includes a thin film of an inorganic solid electrolyte and is suitable for use in a lithium secondary cell, wherein said method comprises the following steps in sequence:

a) providing a plurality of containers including at least one closed container containing a first source material of at least one of lithium metal and lithium alloys, and containing a second source material for use in forming said inorganic solid electrolyte;

b) placing said at least one closed container into at least one inlet chamber space insulated from air;

c) opening said at least one closed container in said at least one inlet chamber space, and taking out said first source material and said second source material from said at least one container in said at least one inlet chamber space;

d) transferring said first source material and said second source material, without exposure to air, from said at least one inlet chamber space into a film forming apparatus that is adjacent and connected in an airtight manner to said at least one inlet chamber space;

e) in said apparatus, carrying out a first film forming process using said first source material to form a base thin film of said first source material on a base material, and carrying out a second film forming process using said second source material to form said thin film of said inorganic solid electrolyte on said base thin film on said base material, to thereby make said independent negative electrode including said base material with said thin film formed thereon;

f) transferring said independent negative electrode, without exposure to air, from said film forming apparatus into an outlet chamber space that is insulated from air and is adjacent and connected in an airtight manner to said film forming apparatus;

g) in said outlet chamber space, without exposing said independent negative electrode to air, placing said independent negative electrode into a storage container selected from among said plurality of containers, and closing said storage container; and h) removing said storage container, with said independent negative electrode closed therein, from said outlet chamber space into an environment of atmospheric air.

18. The method according to claim 17, wherein said at least one inlet chamber space and said outlet chamber space is respectively substantially inactive to lithium.

19. The method according to claim 17, wherein said outlet chamber space is separate and distinct from said at least one inlet chamber space.

20. The method according to claim 17, wherein said outlet chamber space is the same chamber apace as one of said at least one inlet chamber space.

21. The method according to claim 17, wherein said storage container is separate and distinct from said at least one closed container.

22. The method according to claim 17, wherein said storage container is the same container as one of said at least one closed container being reused as said storage container.

23. The method according to claim 17, further comprising, after said step h), taking said independent negative electrode out of said storage container, and assembling said independent negative electrode with other components to make a lithium secondary cell.

24. The method according to claim 17, wherein said first film forming process is a vapor deposition process.

25. The method according to claim 24, comprising carrying out said vapor deposition process so as to form said base thin film with a thickness of at most 20 µm on said base material.

26. The method according to claim 17, further comprising, during said steps c) and d), filling said at least one inlet chamber space and said film forming apparatus with a gas selected from the group consisting of helium, nitrogen, neon, argon, krypton, a mixture gas of at least two of the foregoing gases, and dry air having a dew point of −50° C. or below.

27. The method according to claim 17, further comprising, during said steps f) and g), filling said outlet chamber space and said film forming apparatus with a gas selected from the group consisting of helium, nitrogen, neon, argon, krypton, a mixture gas of at least two of the foregoing gases, and dry air having a dew point of −50° C. or below.

28. The method according to claim 17, wherein said thin film of said inorganic solid electrolyte has a composition containing: 30 to 65 atomic percent of lithium; sulfur; and at least one element selected from the group consisting of phosphorous, silicon, boron, germanium, and gallium.

29. The method according to claim 28, wherein said composition further contains at least one of oxygen and nitrogen.

30. The method according to claim 28, wherein said thin film of said inorganic solid electrolyte is amorphous.

31. The method according to claim 28, wherein said thin film of said inorganic solid electrolyte has an ionic conductance of at least $1 \times 10^{-4}$ S/cm at 25° C.

32. The method according to claim 28, wherein said second film forming process is a process selected from the group consisting of sputtering, vapor evaporation, laser ablation, and ion plating.

33. A method of independently producing an independent negative electrode by itself, wherein said negative electrode includes a thin film of an inorganic solid electrolyte and is suitable for use in a lithium secondary cell, wherein said method comprises the following steps:

a) providing a first closed container containing a first source material selected from the group consisting of lithium metal and lithium alloys;

b) placing said first closed container into a first inlet chamber space insulated from air;

c) opening said first closed container in said first inlet chamber space, and taking out said first source material from said first closed container in said first inlet chamber space;

d) transferring said first source material, without exposure to air, from said first inlet chamber space into a first film forming apparatus that is adjacent and connected in an airtight manner to said first inlet chamber space;

e) in said first film forming apparatus, carrying out a first film forming process using said first source material to form a first thin film of said first source material on a base material provided in said first film forming apparatus, to make an intermediate component including said first thin film on said base material;

f) transferring said intermediate component, without exposure to air, from said first film forming apparatus into a first outlet chamber space that is insulated from air and is adjacent and connected in an airtight manner to said first film forming apparatus;

g) in said first outlet chamber space, without exposure to air, placing said intermediate component into a temporary storage container, and closing said temporary storage container;

h) providing a second closed container containing a second source material for use in forming said inorganic solid electrolyte;

i) placing said temporary storage container and said second closed container into a second inlet chamber space insulated from air;

j) opening said temporary storage container and said second closed container in said second inlet chamber space, and taking out said intermediate component and said second source material from said temporary storage container and said second container in said second inlet chamber space;

k) transferring said intermediate component and said second source material, without exposure to air, from said second inlet chamber space into a second film forming apparatus that is adjacent and connected in an airtight manner to said second inlet chamber space;

l) in said second film forming apparatus, carrying out a second film forming process using said second source material to form said thin film of said inorganic solid electrolyte on said intermediate component, to thereby make said independent negative electrode including said base material with said first thin film and said thin film of said inorganic solid electrolyte formed thereon;

m) transferring said independent negative electrode, without exposure to air, from said second film forming apparatus into a second outlet chamber apace that is insulated from air and is adjacent and connected in an airtight manner to said second film forming apparatus;

n) in said second outlet chamber space, without exposing said independent negative electrode to air, placing said independent negative electrode into a storage container and closing said storage container; and o) removing said storage container, with said independent negative electrode closed therein, from said second outlet chamber space into an environment of atmospheric air.

34. The method according to claim 33, wherein all of said chamber spaces are substantially inactive to lithium.

35. The method according to claim 33, wherein said first outlet chamber space is separate and distinct from said first inlet chamber space, and said second outlet chamber space is separate and distinct from said second inlet chamber space.

36. The method according to claim 33, wherein said first outlet chamber space is the same chamber space as said first inlet chamber space, and said second outlet chamber space is the same chamber space as said second inlet chamber space.

37. The method according to claim 33, wherein said storage container is separate and distinct from said temporary storage container.

38. The method according to claim 33, wherein said storage container is the same container as said temporary storage container being reused as said storage container.

39. The method according to claim 33, further comprising, after said step o), taking said independent negative electrode out of said storage container, and assembling said independent negative electrode with other components to make a lithium secondary cell.

40. The method according to claim 33, wherein said first film forming process is a vapor deposition process.

41. The method according to claim 40, comprising carrying out said vapor deposition process so as to form said first thin film with a thickness of at most 20 μm on said base material.

42. The method according to claim 33, further comprising, during said steps c) and d) and during said steps j) and k), respectively filling said first and second inlet chamber spaces and said first and second film forming apparatuses with a gas selected from the group consisting of helium, nitrogen, neon, argon, krypton, a mixture gas of at least two of the foregoing gases, and dry air having a dew point of −50° C. or below.

43. The method according to claim 33, further comprising, during said steps f) and g) and during said steps m) and n), respectively filling said first and second outlet chamber spaces and said first and second film forming apparatuses with a gas selected from the group consisting of helium, nitrogen, neon, argon, krypton, a mixture gas of at least two of the foregoing gases, and dry air having a dew point of −50° C. or below.

44. The method according to claim 33, wherein said thin film of said inorganic solid electrolyte has a composition containing: 30 to 65 atomic percent of lithium; sulfur; and at least one element selected from the group consisting of phosphorous, silicon, boron, germanium, and gallium.

45. The method according to claim 44, wherein said composition further contains at least one of oxygen and nitrogen.

46. The method according to claim 44, wherein said thin film of said inorganic solid electrolyte is amorphous.

47. The method according to claim 44, wherein said thin film of said inorganic solid electrolyte has an ionic conductance of at least $1\times10^{-4}$ S/cm at 25° C.

48. The method according to claim 44, wherein said second film forming process is a process selected from the group consisting of sputtering, vapor evaporation, laser ablation, and ion plating.

* * * * *

UNITED STATES PATENT AND TRADEMARK OFFICE
CERTIFICATE OF CORRECTION

PATENT NO. : 6,656,233 B2
DATED : December 2, 2003
INVENTOR(S) : Kugai et al.

It is certified that error appears in the above-identified patent and that said Letters Patent is hereby corrected as shown below:

Column 1,
Line 38, after "a", replace "dencdroid" by -- dendroid --;
Line 61, after "inorganic", delete "air.";
Line 63, after "by", insert -- air. --.

Column 17,
Line 16, before "as", replace "apace" by -- space --.

Column 18,
Line 57, after "chamber", replace "apace" by -- space --.

Signed and Sealed this

Thirtieth Day of March, 2004

JON W. DUDAS
*Acting Director of the United States Patent and Trademark Office*